United States Patent [19]

Watanabe

[11] 4,165,521

[45] Aug. 21, 1979

[54] VIDEO SIGNAL REPRODUCING SYSTEM WITH MOVEABLE HEAD FOR SLOW OR STOP TRACKING CONTROL

[75] Inventor: Yoshimi Watanabe, Yokohama, Japan

[73] Assignee: Sony Corporation, Tokyo, Japan

[21] Appl. No.: 911,832

[22] Filed: Jun. 2, 1978

Related U.S. Application Data

[63] Continuation of Ser. No. 731,763, Oct. 12, 1976.

[30] Foreign Application Priority Data

Oct. 14, 1975 [JP] Japan ............... 50-123638

[51] Int. Cl.² .............. H04N 5/78; G11B 21/04; G11B 21/10
[52] U.S. Cl. .............................. 360/10; 360/77; 360/101; 360/107
[58] Field of Search ............. 360/10, 69, 70, 75–78, 360/84, 85, 101, 104, 107, 108

[56] References Cited

U.S. PATENT DOCUMENTS

| | | | |
|---|---|---|---|
| 3,375,331 | 3/1968 | Okazaki et al. | 360/10 |
| 3,526,726 | 9/1970 | Corbett et al. | 360/76 |
| 3,787,616 | 1/1974 | Falk et al. | 360/75 |

FOREIGN PATENT DOCUMENTS

| | | | |
|---|---|---|---|
| 49-50616 | 1/1974 | Japan | 360/10 |
| 49-84617 | 8/1974 | Japan | 360/77 |

OTHER PUBLICATIONS

Price, Videotape Recorder with Oscillating Head, IBM Tech. Disc. Bulletin, vol. 12, No. 1, 6/69.

*Primary Examiner*—Raymond F. Cardillo, Jr.
*Attorney, Agent, or Firm*—Lewis H. Eslinger; Alvin Sinderbrand

[57] ABSTRACT

A video signal reproducing system having a normal signal reproducing mode and a still signal reproducing mode includes a control signal generating means for reproducing a still mode control signal. A support means for supporting a signal reproducing means is responsive to the still mode control signal, whereby the signal reproducing means is maintained in substantial alignment with a recorded track of a recorded medium. Accordingly, the mis-tracking of the signal reproducing means relative to a predetermined recorded track is prevented, when the still signal reproducing mode is selected.

6 Claims, 19 Drawing Figures

VIDEO SIGNAL REPRODUCING SYSTEM WITH MOVEABLE HEAD FOR SLOW OR STOP TRACKING CONTROL

This is a continuation, of application Ser. No. 731,763, filed Oct. 12, 1976.

BACKGROUND OF THE INVENTION

1. Field of the Invention

This invention relates to a system for reproducing a video signal recorded in parallel track sections on a recording medium, and more particularly to a system having a normal signal reproducing mode, during which the recorded medium is transported at a predetermined normal speed relative to a signal reproducing head, and a still signal reproducing mode, during which the transportation of the recording medium is stopped.

Generally, in a video signal reproducing system that includes a normal signal reproducing mode and a normal play-back mode, either of which can be selectively obtained, the scanning direction of the signal reproducing head is inclined to the direction in which the recorded medium is transported. Accordingly, when the normal play-back mode and the still play-back mode require different relative positional relationships between the signal reproducing head and the recorded medium, the predetermined recorded track on the recorded medium cannot be scanned in at least one of the modes by the head without mistracking.

2. Description of the Prior Art

In a conventional video tape recorder (VTR), the level of at least one of the tape guides arranged around a head drum containing a magnetic head can be varied to control the inclination angle of the magnetic tape to the head drum. Desirable inclination angles of the tape can be obtained with the variation of the level of the tape guide both in the normal play-back mode and in the still play-back mode. However, a precise mechanism is required to vary the level of at least one of the tape guides so as to control the inclination angle of the magnetic tape to the head drum. Such conventional video signal reproducing apparatus has the disadvantages of being large, heavy, and expensive.

SUMMARY OF THE INVENTION

Accordingly, it is an object of this invention to provide a video signal reproducing system which overcomes the above described disadvantages.

The above and other objects, features and advantages of this invention, will be apparent in the following detailed description of illustrative embodiments which are to be read in connection with the accompanying drawings.

DESCRIPTION OF THE PREFERRED EMBODIMENTS

One embodiment of this invention will be described with reference to FIGS. 1-5.

Figure 1:
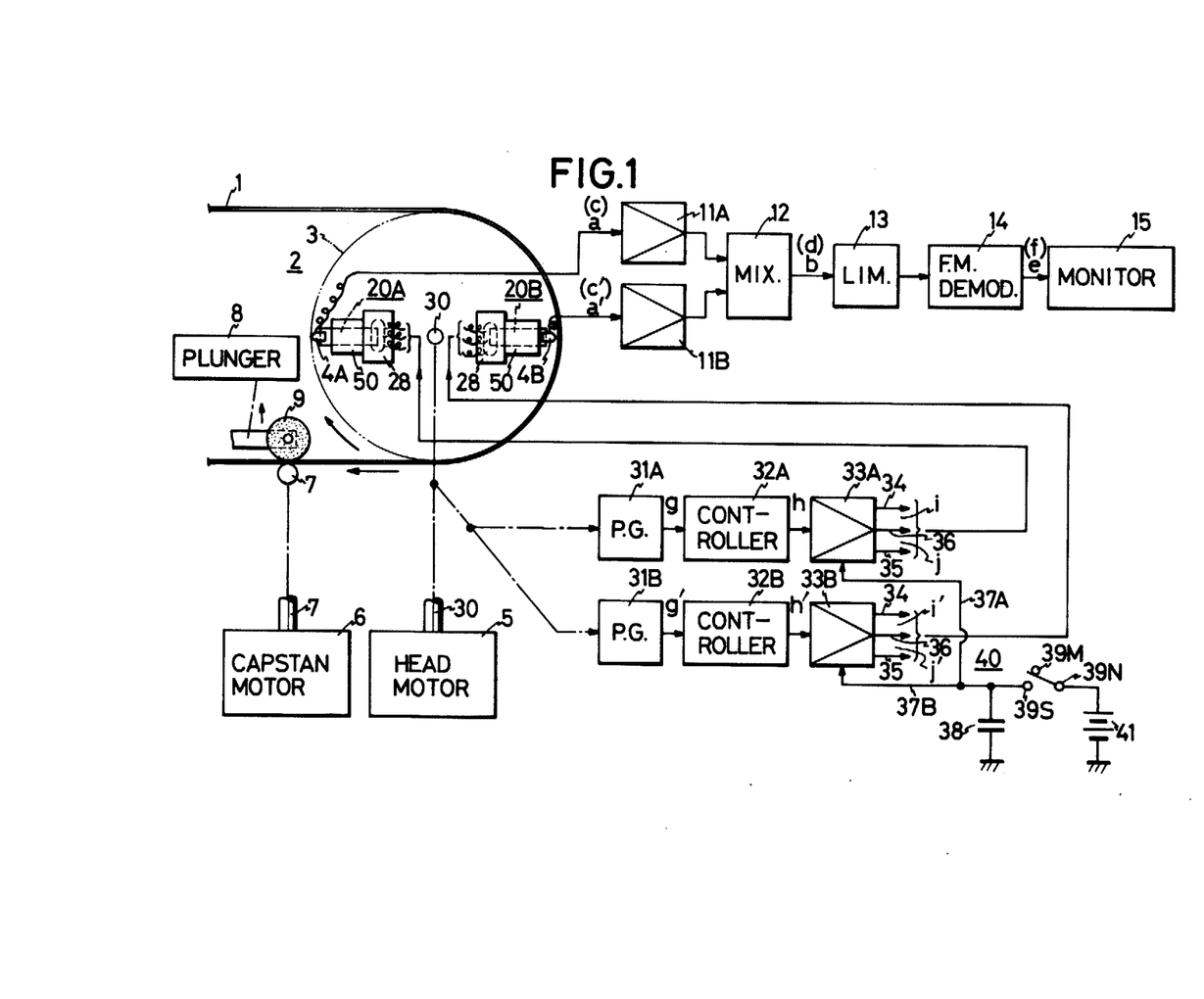
FIG. 1 is a block diagram of a video signal reproducing system according to one embodiment of this invention.

FIG. 1 shows a block diagram of a video signal reproducing system which includes a rotary head drum assembly 2. A video signal is recorded on, and reproduced from, a magnetic medium in the form of a magnetic tape 1 by the rotary head drum assembly 2.

The drum assembly 2 includes a stationary lower head drum (not shown). The magnetic tape 1 is obliquely guided in the shape of $\Omega$ by the lower head drum, and is transported at a predetermined normal speed. An upper head drum 3 is rotatably arranged above the lower head drum, concentric with the latter. The upper head drum 3 rotates one revolution per period 2Tv of one frame of video signal, namely at the rate of 30 cycles per second. A pair of magnetic heads 4A and 4B diametrically opposite to each other, or spaced from each other at an angular interval of 180°, is arranged on the lower surface of the upper head drum 3. As shown particularly in FIG. 5, air gaps are formed between the magnetic heads 4A and 4B, and the lower surface of the upper head drum 3 and extend perpendicularly to the latter.

Figure 2:
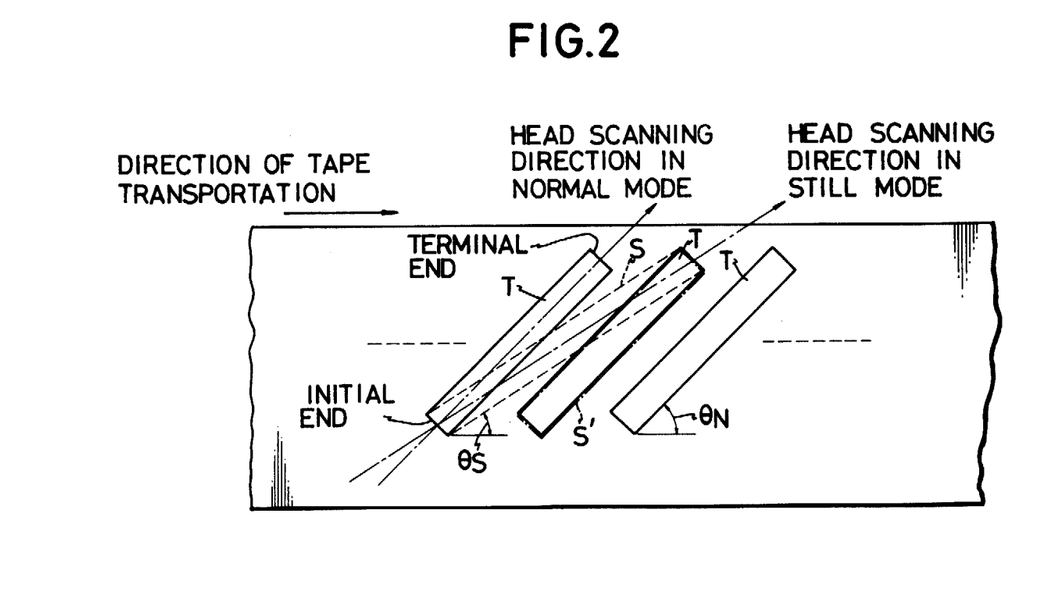
FIG. 2 shows an enlarged section of tape for assistance in explaining the embodiment in FIG. 1 and shows the relationship between the track on the magnetic tape and the scanning direction of the magnetic head.

The heads 4A and 4B scan the magnetic tape 1 as the upper head drum 3 rotates, and when video signals to be recorded are supplied to the magnetic heads 4A and 4B, recorded tracks T are formed for every field of video signals on the magnetic tape 1. As shown in FIG. 2, the recorded tracks T are inclined to the lengthwise direction of the magnetic tape 1 by an angle $\theta_N$. In the reproducing operation, the magnetic heads 4A and 4B scan the recorded tracks T on the magnetic tape 1 to reproduce the video signals recorded thereon.

The rotary head drum assembly 2 is the same as the known rotary head drum assembly in a so-called "helical two-head $\Omega$-type VTR". Accordingly, the construction of the rotary head drum assembly 2 will not be further described. Moreover, since this invention is directed to the reproduction of video signals from the recorded tracks on the magnetic tape, a system by which video signals are recorded on the magnetic tape, will not be described in detail. The upper head drum 3 of the rotary head drum assembly 2 is connected to a head motor 5 through a rotary shaft 30 to rotate at the rate of 30 cycles per second, corresponding to the period of 2Tv. A standard drive circuit for the head motor 5 may be used and, therefore, is not shown. The magnetic tape 1 is pressed between a capstan 7 connected to a capstan motor 6, and a pinch roller 9 to be transported at a predetermined normal speed. The pinch roller 9 is controlled by a plunger 8 so that it can either be separated from the capstan 7 or pressed toward the capstan 7. The plunger 8 separates the pinch roller from the capstan when a still-mode selecting button (not shown) is pushed to select the still signal reproducing mode.

Figure 3A:
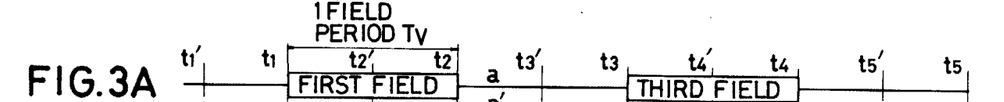
FIG. 3A to FIG. 3N are waveforms of signals generated in the system of FIG. 1.

Reproduced video signals obtained from the magnetic heads 4A and 4B are denoted by reference letters a and a' respectively. When a reproduced video signal is obtained through the magnetic head 4A from the first field of video signals recorded on the magnetic tape 1, the reproduced video signal a consists of odd-numbered fields (first field, third field, fifth field . . . ) of video signals recorded on the magnetic tape 1, as shown in FIG. 3A. Correspondingly, the reproduced video signal a' consists of even-numbered fields (second field, fourth field, sixth field, . . . ) of video signals recorded on the magnetic tape 1, as shown in FIG. 3B.

Figures 3B, 3C, 3D:
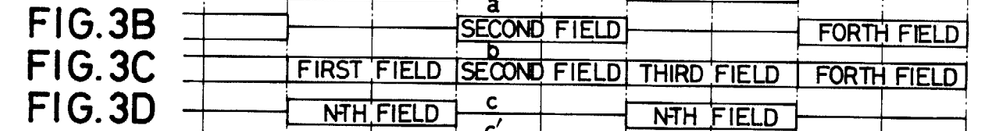

As shown in FIG. 1, the reproduced video signals a and a' obtained from the magnetic heads 4A and 4B are supplied through amplifiers 11A and 11B, alternately, to a mixer 12 to be combined with each other in the mixer to form a continuous reproduced video signal b, as shown in FIG. 3C.

The video signal recorded on the magnetic tape 1 may be a frequency modulated signal as usual in which case the reproduced video signals a, a' and b will also be frequency modulated signals. Accordingly, the reproduced video signal b from the mixer 12 passes through a limiter 13 to a well known frequency demodulator 14. The demodulated reproduced video signal e obtained from the frequency demodulator 14 is supplied to a monitor 15 on which the reproduced video picture is obtained.

In the video signal reproducing system of FIG. 1, when the plunger 8 is actuated to separate the pinch roller 9 from the capstan 7, the transportation of the magnetic tape 1 continues to be stopped, while the magnetic tape 1 is guided by the lower head drum. The inclination angle of the scanning direction of the magnetic heads 4A and 4B relative to the magnetic tape 1 varies when transportation of the tape stops. Accordingly, the magnetic heads 4A and 4B scan the magnetic tape 1, deflected from the recorded track T on the latter. The mis-tracking occurs. The relationship between the scanning path S of the magnetic heads 4A and 4B and the recorded track T is shown on FIG. 2. The inclination angle $\theta_S$ of the scanning path S is different from the inclination angle $\theta_N$ of the recorded track T. The difference $(\theta_N - \theta_S)$ is a mistracking angle. In FIG. 2, both the rotational direction of the upper head drum 3, or the scanning direction of the magnetic heads 4A and 4B to the magnetic tape 1, and the transporting direction of the magnetic tape 1 are forward.

According to this embodiment, with the stopping of the transportation of the magnetic tape 1, the positions of the magnetic heads 4A and 4B relative to the tape are varied from the normal positions so as to equalize the inclination angle $\theta_S$ of the scanning path S of the magnetic heads 4A and 4B with the inclination angle $\theta_N$ of the recorded track T.

As the result, the magnetic heads 4A and 4B move on a scanning path S', as shown on FIG. 2, and the terminal end of the scanning path S' coincides with that of the recorded track T. The video signal recorded on the track T is repeatedly reproduced in the form of video signals c and c', shown in FIG. 3D and FIG. 3E, and obtained from the magnetic heads 4A and 4B. It is apparent that the magnetic heads 4A and 4B track repeatedly on the same portion of the magnetic tape 1, since the transportation of the magnetic tape 1 is stopped.

Figure 3E:
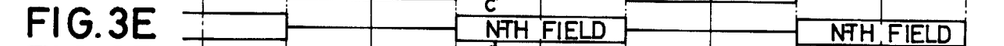
Figure 3F:
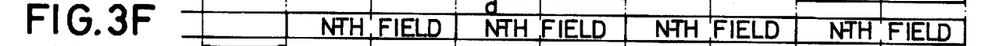

When the terminal end of the scanning path S' coincides with that of the track T on which the video signal of the N-th field is recorded, the video signal of the N-th field is intermittently repeated in the reproduced video signals c, and c' as shown on FIG. 3D and FIG. 3E, respectively. The non-signal section of the reproduced video signal c', that is, each interval when the signal c' is not produced, corresponds to the signal section of the reproduced video signal c. And the signal section of the reproduced video signal c' corresponds to the non-signal section of the reproduced video signal c. Accordingly, a continuously repeated video signal of the N-th field is obtained from the mixer 12, as shown in FIG. 3F, and a corresponding demodulated signal is similarly obtained from the frequency demodulator 14. A still picture corresponding to the reproduced video signal f from the frequency demodulator 14 is obtained in the television monitor 15.

According to the one embodiment of this invention, the following construction is used for the displacement of the magnetic heads 4A and 4B from the normal positions to operate in the still play-back mode.

In the rotary head drum assembly 2, as shown in FIG. 1., the magnetic heads 4A and 4B are attached to the upper head drum 3 by piezo-ceramic leaves 20A and 20B so that the magnetic heads 4A and 4B can be displaced from the normal positions in the air gap between the lower surface of the upper head drum 3 and the upper surface of the lower head drum. In the still play-back mode, a head position control signal, which will be hereafter described, is supplied to the piezo-ceramic leaves 20A and 20B.

Next, one example of the piezo-ceramic leaves 20A and 20B will be described with reference to FIG. 4 and FIG. 5.

The piezo-ceramic leaves 20A and 20B include pairs of plate-like piezo-ceramic materials 23 and 24, respectively, with conductive layers 21 and 22 formed on both sides of the piezo-ceramic materials 23 and 24. A monomorph leaf is formed by the conductive layers 21 and 22 and the piezo-ceramic material 23 and 24. The two conductive layers 22 are combined with each other to obtain a bi-morph leaf. According to this embodiment, the piezo-ceramic leaves 20A and 20B are used as a bi-morph leaf.

Lead wires 25 and 26 are connected to the outer conductive layers 21 on the piezo-ceramic materials 23 and 24, respectively, and a lead wire 27 is connected to the combined conductive layers 22. In this embodiment, the piezo-ceramic leaves 20A and 20B connected to three lead wires are used as the bi-morph leaf. The piezo-ceramic materials 23 and 24 are controlled by separate control signals. Accordingly, the distortions of the materials 23 and 24, and the errors of the control signals are averaged, so that great error can be avoided.

One end of the piezo-ceramic leaves 20A and 20B are fixed on the upper head drum 3. When voltages of opposite polarities are applied to the lead wires 25 and 26 with reference to the lead wire 27, respectively, a bending force is generated in the piezo-ceramic materials 23 and 24, which functions to bend the piezo-ceramic materials 23 and 24 in the same direction. Accordingly, the top ends of the leaves 20A and 20B are displaced from the normal positions in the direction perpendicular to the surfaces of the materials 23 and 24.

Figure 4:
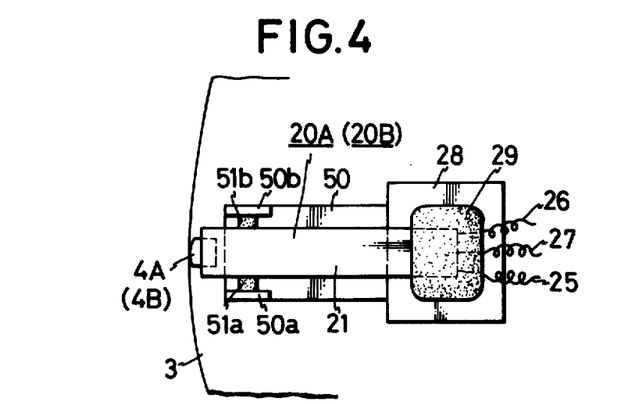
FIG. 4 is an enlarged schematic bottom view of the magnetic head and a head-mounting means.
Figure 5:
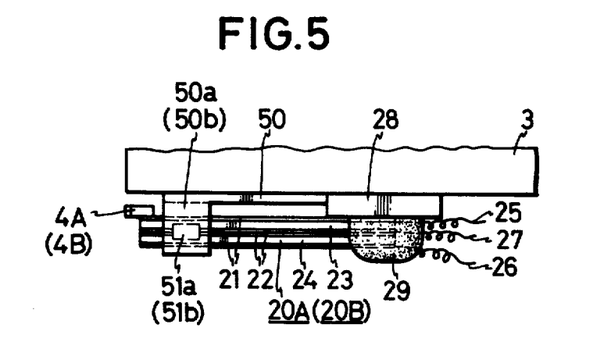
FIG. 5 is an enlarged schematic side view of the magnetic head and head-mounting means of FIG. 4.

As shown in FIG. 4 and FIG. 5, mounting bases 28 are affixed to the lower surface of the upper head drum 3. The base ends of the piezo-ceramic leaves 20A and 20B are affixed to the mounting bases 28 by adhesive 29. The leaves 20A and 20B are so arranged that the surfaces of the piezo-cramic materials 23 and 24 are parallel with the lower surface of the upper head drum 3. The magnetic heads 4A and 4B are attached to the free ends of the leaves 20A and 20B. The lengthwise directions of the air gaps of the heads 4A and 4B are perpendicular to the surfaces of the materials 23 and 24, and the surfaces of the materials 23 and 24 are substantially perpendicular to the rotational shaft 30 of the upper head drum 3.

Damper members 51a and 51b may be provided for damping free oscillation due to the bending force applied to the piezo-cramic leaves 20A and 20B. The damper members 51a and 51b are attached to a pair of tabs 50a and 50b attached to one end of a damper mounting plate 50 which is attached, in turn, to the lower surface of the upper head drum 3. The damper mounting plates 50 extend toward the periphery of the upper head drum 3 from the outward side of the mounting base 28. The damper members 51a and 51b are pressed between the sides of the piezo-cramic leafs 20A and 20B and the tabs 50a and 50b, respectively. When no voltage is supplied to the lead wires 25, 26 and 27 for the piezo-ceramic leaves 20A and 20B, the piezo-ceramic leafs 20A and 20B are not displaced from their normal positions, that is, the free ends of the leaves 20A and 20B on which the magnetic heads 4A and 4B are mounted at their normal positions, respectively. Accordingly, in the normal signal reproducing mode, the magnetic heads 4A and 4B scan the tracks T of the magnetic tape 1 without mistracking.

As above described, the reproduced video signals a and a' are obtained from the magnetic heads 4A and 4B, as shown in FIG. 3A and FIG. 3B. In the still play back mode, when no voltage is applied to the lead wires 25, 26 and 27 for the piezo-cramic leafs 20A and 20B, the magnetic heads 4A and 4B scan the magnetic tape 1 along the scanning path S which is inclined by the angle $\theta_s$ to the lengthwise direction of the magnetic tape 1. When voltages of opposite polarities are applied to the lead wires 25 and 26 with reference to the lead wire 27, the free ends of the piezo-cramic leafs 20A and 20B, and, therefore, the magnetic heads 4A and 4B are displaced from their normal positions, relative to the upper head drum 3. When the voltages supplied to the lead wires 25 and 26 are alternating, the displacements of the magnetic heads 4A and 4B vary in accordance with the wave forms of the alternating voltages.

Next, one example of a head position control signal as the alternating voltage and arrangements for generating the head position control signal will be described.

In the system of FIG. 1, well known pulse generators 31A and 31B are arranged in relation to the rotary shaft 30 of the upper head drum 3 in the rotary head drum assembly 2.

Figure 3G:
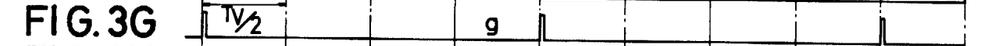
Figure 3H:
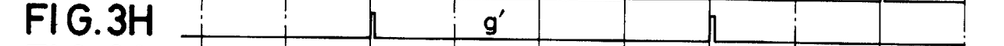

In the reproduced video signal a obtained from the magnetic head 4A, as shown in FIG. 3A, starting times of the odd-numbered fields are denoted by $t_1$, $t_3$, $t_5$ . . . , while in the reproduced video signal a' obtained from the magnetic head 4B, starting times of the even-numbered fields are denoted by $t_2$, $t_4$, $t_6$ . . . Whether the system is in the still play-back mode or not, a row of pulses g shown in FIG. 3G is obtained from the pulse generator 31A, and a row of pulses g' shown in FIG. 3H is obtained from the pulse generator 31B. The row of pulses g consists of a first pulse at time $t_1'$, which is between time $t_1$ and time preceding the time $t_1$ by one field period Tv. For example, the time $t_1'$ precedes the time $t_1$ by a half of one field period Tv, a second pulse occurs at the time $t_3'$ between time $t_2$ and time $t_3$, a third pulse occurs at time $t_5'$ between time $t_4$ and time $t_5$, and so on. In the same manner, the row of pulses g' consists of a first pulse at time $t_2'$ between time $t_1$ and time $t_2$, a second occurs at time $t_4'$ between time $t_3$ and time $t_4$, and so on. The time intervals between the pulses g and g' are 2Tv, respectively, and the phase difference between successive pulses g and g' is Tv.

Figure 3I:
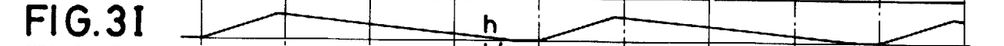
Figure 3J:
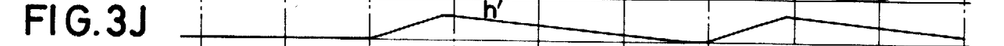
Figure 3K:
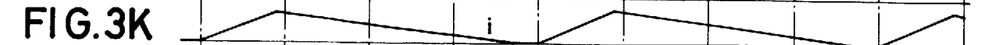
Figure 3L:
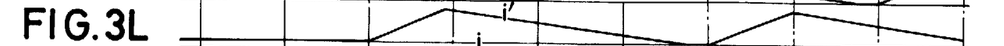
Figure 3M:
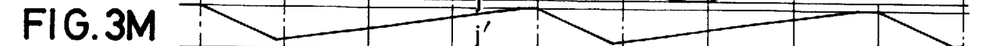
Figure 3N:
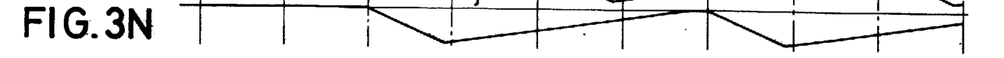

The pulses g and g' from the pulse generators 31A and 31B are supplied to controllers 32A and 32B which may be sawtooth wave generators. Sawtooth waves h and h' as shown in FIG. 3I and FIG. 3J are obtained from the controllers 32A and 32B. The sawtooth wave h rises from the reference level at times $t_1'$, $t_3'$, $t_5'$ . . . , reaches its maximum level at times preceding times $t_1$, $t_3$, . . . , by a little time and then gradually falls to the reference level at times between times $t_2$, $t_4$, . . . , and times $t_3'$, $t_5'$, . . . , while the sawtooth wave h' rises from the reference level at times $t_2'$, $t_4'$, $t_6'$ . . . , reaches its maximum level at times preceding times $t_2$, $t_4$, $t_6$ . . . by a little time, and then, gradually falls to the reference level at times between times $t_3$, $t_5$, $t_7$ . . . and times $t_4'$, $t_6'$, $t_8'$ . . . The sawtooth waves h and h' from the controllers 32A and 32B are supplied to respective drive circuits 33A and 33B which may be amplifiers. A sawtooth wave i of the same polarity as the polarity of the wave h shown in FIG. 3K, is obtained between output terminals 34 and 36 of the drive circuit 33A, corresponding to the sawtooth wave h, and a sawtooth wave j of the opposite polarity to the wavetooth wave h, shown in FIG. 3M, is obtained between output terminals 35 and 36 of the drive circuit 33A, corresponding to the sawtooth wave h. A sawtooth wave i' of the same polarity as the polarity of the sawtooth wave h', shown in FIG. 3L, is obtained between output terminals 34 and 36 of the drive circuits 33B, corresponding to the sawtooth wave h'. A sawtooth wave j' of the opposite polarity to the polarity of the wave h', shown in FIG. 3N, is obtained between output terminals 35 and 36 of the drive circuit 33B, corresponding to the wave h'.

The sawtooth waves i and j are supplied as the head position control signals for the piezo-ceramic leaf 20A between the lead wires 25 and 27, and between the lead wires 26 and 27 in the rotary head drum assembly 2, respectively. Similarly, the sawtooth waves i' and j' are supplied as the head position control signals for the piezo-ceramic leaf 20B between the lead wires 25 and 27 and between the lead wires 26 and 27, respectively. The amplitudes of the sawtooth waves i and J are so selected that the displacements of the magnetic head 4A due to the level difference between the level of the waves i at times $t_1$, $t_3$, . . . when the magnetic head 4A is positioned at the initial end of the track T, and the level of the waves i at times $t_2$, $t_4$ . . . when the magnetic head 4A is positioned at the terminal end of the track T, and due to the level difference between the level of the waves j at times $t_1$, $t_3$ . . . when the magnetic head 4A is positioned at the initial end of the track T, and the level of the waves j at times $t_2$, $t_4$, . . . when the magnetic head 4A is positioned at the terminal end of the track T, correspond to half of the distance between the adjacent two tracks T. And similarly, the amplitrudes of the waves i' and j' are so selected that the displacements of the magnetic head 4B due to the level difference between the level of the wave i' at times $t_2$, $t_4$ . . . when the magnetic head 4B is positioned at the initial end of the track T, and the level of the waves i' at times $t_3$, $t_5$ . . . when the magnetic head 4B is positioned at the terminal end of the track T, and due to the level difference between the level of the wave j' at times $t_2$, $t_4$ . . . when the magnetic head 4B is positioned at the initial end of the track T, and the level of the waves j' at times $t_3$, $t_5$ . . . when the magnetic head 4B is positioned at the terminal end of the track T, correspond to half of the distance between the adjacent two tracks T.

Only when electric power is supplied to the drive circuits 33A and 33B through power lines 37A and 37B, the sawtooth waves i, j, i' and j' are obtained from the drive circuits 33A and 33B. When no electric power is supplied to the drive circuits 33A and 33B, zero voltages are obtained from the drive circuits 33A and 33B. The power lines 37A and 37B are connected to ground through a charging capacitor 38, and to a DC power source 41 through a switch 40 for the still play-back mode. The switch 40 consists of a movable contact 39N, which is connected to the DC power source 41, and a pair of stationary contacts 39S and 39M. The stationary contact 39S is conneted to the power lines 37A and 37B and the stationary contact 39M is a dead contact for the normal play-back mode.

In the normal play-back mode, the magnetic tape 1 is pinched between the pinch roller 9 and the capstan 7, and so it is transported at the normal speed. Since the movable contact 39N of the switch 40 is connected to the stationary contact 39M, only zero-voltage is obtained from the drive circuits 33A and 33B. Accordingly, no voltage is applied to the piezo-ceramic leafs 20A and 20B, and so the magnetic heads 4A and 4B are located at their respective normal positions to scan the tracks T of the magnetic tape 1 without mistracking.

The video signals recorded on the magnetic tape 1 are reproduced by the magnetic heads 4A and 4B. The reproduced video signals a and a' shown on FIG. 3A and FIG. 3B are obtained from the magnetic heads 4A and 4B and are combined with each other by the mixer 12. The continuous reproduced signal b obtained from the mixer 12, as shown on FIG. 3C is then demodulated by the frequency demodulator 14, and the resulting demodulated signal is supplied to the television monitor 15 to obtain a normal picture.

In the still play-back mode, the plunger 8 for controlling the pinch roller 9 is actuated by pushing the still-mode selecting button. This causes the pinch roller 9 to be separated from the capstan 7, and a take-up reel (not shown) stops in response to actuation of the still-mode selecting button. Accordingly, the magnetic tape 1 stops but retains its configuration partially wound on the lower head drum.

The movable contact 39N of the switch 40 interlocked with the still-mode selecting button is connected to the stationary contact 39S for the still play-back mode. Accordingly, the sawtooth waves i, j, i', and j' are obtained from the drive circuits 33A and 33B, and they are supplied to the piezo-ceramic leaves 20A and 20B as the head position control signals. The free ends of the piezo-cramic leafs 20A and 20B, and, therefore, the magnetic heads 4A and 4B, are displaced relative to the upper head drum 3 from their normal positions in accordance with the wave forms of the control signals, in the lengthwise directions of the air gaps. Accordingly, when the wave forms and amplitudes of the control signals are suitably selected, the magnetic heads 4A and 4B scan the track T corresponding to the N-th field of video signals recorded on the magnetic tape 1, without mistracking, as shown by the dot-dash line S' on FIG. 2.

The N-th field of video signals is reproduced by the magnetic heads 4A and 4B. The reproduced video signals c and c' shown in FIG. 3D and FIG. 3E are obtained from the magnetic heads 4A and 4B, and they are combined with each other by the mixer 12. The continuously repeated reproduced video signal d is obtained from the mixer 12, as shown in FIG. 3F. The signal d is demodulated by the frequency demodulator 14 and the resulting demodulated video signal is supplied to the monitor 15 to reproduce the still picture.

The still play-back mode is terminated by a second actuation that reverses the condition of the still-mode selecting button. The movable contact 39N of the switch 40 is changed over to the stationary contact 39M for the normal play-back mode. Operation of the circuit FIG. 1 following termination of the still play-back mode will be described.

When the movable contact 39N of the switch 40 is changed over to the stationary contact 39M, the capacitor 38 is disconnected from the DC power source 41 and the charging voltage of the capacitor 38 gradually drops. Accordingly, the head position control signal constituted by the sawtooth waves i, i', j, and j' in FIG. 3K, FIG. 3L, FIG. 3M and FIG. 3N gradually decays with time until it is no longer supplied to the piezo-ceramic leaves 20A and 20B. Thus, the supply of the alternating voltage as the head position control signal to the leaves 20A and 20B is not suddenly stopped, but is gradually dropped to zero. Accordingly, no residual strain is imparted to the piezo-ceramic leaves 20A and 20B, but the free ends of the leafs 20A and 20B that determine the positions of the magnetic heads 4A and 4B are surely returned to their normal, or original, position.

In the above-described embodiment, the three lead wires 25, 26 and 27 are connected to the piezo-ceramic leaves 20A and 20B as the bi-morph leaves, respectively. The reference bias voltage is applied to the lead wire 27. The sawtooth wave control voltages, having mutually opposite polarities with reference to the bias voltage supplied to the lead wire 27, are supplied to the lead wires 25 and 26. However, without using the lead wire 27, the reference bias voltage may be supplied to the lead wire 25, and a sawtooth wave control voltage having a predetermined amplitude may be supplied to the lead wire 26. Next, such an arrangement will be described with reference to FIG. 6.

Figure 6:
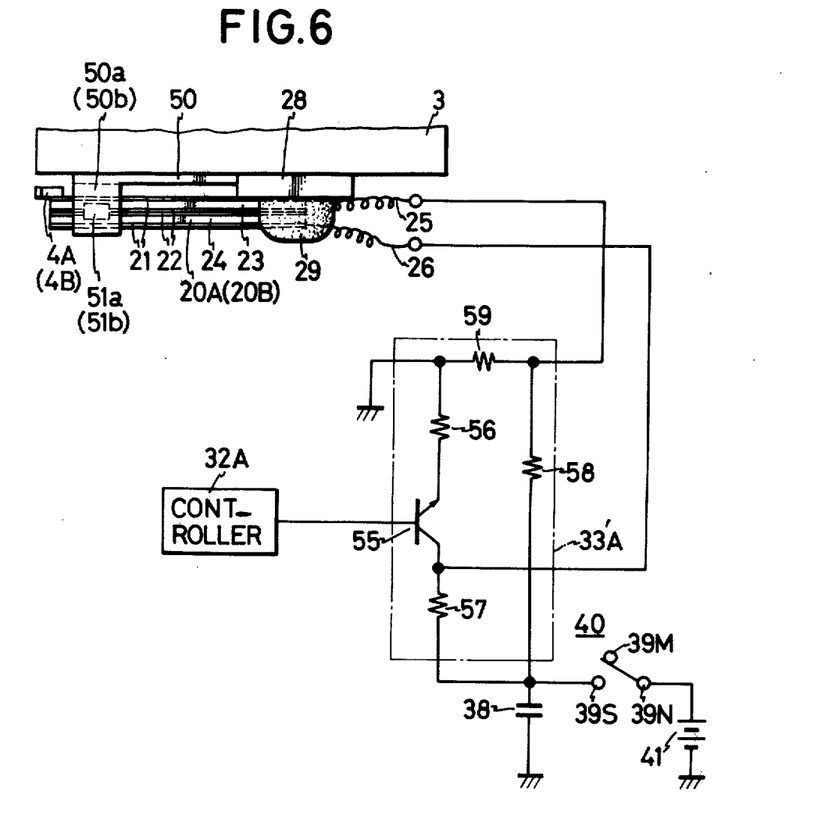
FIG. 6 is a connection diagram of an important part of a video signal reproducing system according to another embodiment of this invention.

In FIG. 6, the magnetic head 4A, the piezo-ceramic leaf 20A, the mounting structure therefore, and a circuit extending from the controller 32A to the piezo-ceramic leaf 20A are shown. The magnetic head 4B, the piezo-ceramic leaf 20B, and the mounting structure therefor are omitted in FIG. 6, since they correspond to as the above-described parts. Similarly, the controller 32B, and a drive circuit connected between the controller 32B and the piezo-ceramic leaf 20B are not shown since they correspond to the parts shown in FIG. 6. The other parts which correspond to the parts in FIG. 1 are not shown in FIG. 6.

In FIG. 6. the output of the controller 32A is supplied to a base electrode of an NPN-type transistor 55 in a drive circuit 33'A corresponding to the drive circuit 33A of FIG. 1. The collector electrode of the transistor 55 is connected to the lead wire 26 of the piezo-ceramic leaf 20A and to the stationary contact 39S of the switch 40 through a load resistor 57. The structures and functions of the capacitor 38, switch 40 and DC power source 41 are the same as in FIG. 1.

The emitter electrode of the transistor 55 is connected through a bias resistor 56 and a voltage dividing resistor 59 to the lead wire 25, and the common circuit point between the resistors 56 and 59 is connected to the ground. The common circuit point between the load resistor 57 and the stationary contact 39S is connected to one end of a voltge dividing resistor 58, the other end of which is connected to the common circuit point between the voltage dividing resistor 59 and the lead wire 25. Accordingly, the reference bias voltage supplied to the lead wire 25 is determined by the voltage dividing resistors 58 and 59.

When the movable contact 39N of the switch 40 is connected to the stationary contact 39S, as it is in the still play-back mode, the voltage from the DC power source 41 is supplied through the load resistor 57 to the collector electrode of the transistor 55, and the reference bias voltage in accordance with the dividing ratio of the voltage dividing resistors 58 and 59 is supplied to the lead wire 25. A sawtooth wave signal is obtained from the collector electrode of the transistor 55, corresponding to the sawtooth wave signal from the controller 32A, and it is supplied to the lead wire 26. Accordingly, the still picture is reproduced on the monitor, as in FIG. 1.

In FIG. 6, a bi-morph leaf is used as the piezo-ceramic leaf 20A, and two lead wires are used. It will be understood that a mono-morph leaf may be used instead of the bi-morph.

Although there have been described the preferred embodiments of this invention, this invention is not limited to those embodiments, but various modifications are possible on the basis of the spirit of this invention.

In the above embodiments, this invention is applied to the well-known helical two-head Ω-type VTR having the well known rotary head drum assembly. However, it may be applied to the well-known helical one-head α-type VTR.

Moreover, this invention is applied to of the helical scanning type in which the magnetic head scans the magnetic tape so as to form recorded tracks thereon obliquely to the lengthwise direction of the magnetic tape. However, this invention may be applied to a VSR (video sheet recorder) in which a magnetic sheet is used instead of the magnetic tape, and a magnetic head scans the magnetic sheet so as to form recorded tracks thereon slightly obliquely to the direction perpendicular to the transportation direction of the magnetic sheet.

In the above embodiments, this invention is applied to the still reproduced picture. However, it may be applied to a slow-motion reproduced picture. In that case, the magnetic tape is transported at a lower speed. The transportation speed is varied in accordance with the desired rate of the slow motion. Accordingly, the amplitude of the sawtooth wave as a control signal is varied in accordance with the desired rate of the slow motion.

What is claimed is:

1. A system for reproducing a video signal recorded in successive parallel tracks on a recording medium, said system comprising:

transport means operative to transport said recording medium at a predetermined speed in a path to which said tracks are obliquely arranged;

mode-selecting means for selecting a normal signal reproducing mode in which said transport means is operative or a still signal reproducing mode in which said transport means is inoperative;

signal reproducing means for reproducing a video signal recorded in a respective one of said tracks by scanning along the respective track;

rotary support means which is rotated in both said normal and still signal reproducing modes;

bi-morph leaf means mounting said signal reproducing means on said rotary support means and having a rest condition in which said signal reproducing means scans said tracks in succession in response to the rotation of said rotary support means in said normal signal reproducing mode, said bi-morph leaf means being movable from said rest condition in either direction transverse to the direction of said tracks for correspondingly displacing said signal reproducing means relative to said rotary support means; and control signal generating means to provide still mode control signals to said bi-morph leaf means by which the latter is moved from said rest condition for causing said signal reproducing means to repeatedly scan along a selected one of said tracks in said still signal reproducing mode, said control signal generating means including means for generating a saw-wave with the cycle thereof corresponding to the interval for scanning of one of said tracks by said signal reproducing means, an electric power source, drive circuit means receiving said saw-wave to correspondingly provide said still mode control signal to said bi-morph leaf means when said drive circuit means is powered by connection to said electric power source, switch means connecting said drive circuit means to said power source when said still signal reproducing mode is selected and disconnecting said drive circuit means from said power source when said normal signal reproducing mode is selected, and a capacitor connected through said switch means to said electric power source, said capacitor being charged through said switch means in said still signal reproducing mode, and said capacitor being discharged to temporarily supply electric power to said drive circuit means when said switch means disconnects the drive circuit means from said power source in said normal signal reproducing mode.

2. The system according to claim 1, wherein said drive circuit means includes an amplifier.

3. The system according to claim 1, in which said means for generating a saw-wave includes a pulse generator for generating reference pulses in synchronism with the rotation of said rotary support means, and saw-tooth generating means triggered by said reference pulses.

4. A system for reproducing a video signal recorded in parallel track sections on a recording medium, said system having a normal mode wherein the recording medium is transported at a predetermined normal speed and a stop mode wherein the transportation of the recording medium is stopped, said system comprising:

recording medium transportation means capable of operating in either of said normal and stop modes;

signal reproducing means for reproducing the video signal from said medium;

rotary support means for rotatably supporting said signal reproducing means such that said signal reproducing means has a normal position to track said track sections accurately in one of said modes;

mode-selecting means connected to said transportation means and being actuable to a selected one of different conditions to cause said transportation means to operate in either of said modes, selectively;

control signal generating means for producing a control signal having a predetermined waveform;

support means including a piezo-ceramic leaf for supporting said signal reproducing means in said normal position on said rotary support means to track said parallel track sections in said one of said modes and being strained in response to said control signal to displace said signal reproducing means relative to said rotary support means and transversely with respect to said recorded track sections to maintain substantial alignment between said signal reproducing means and said recorded track sections when said transportation means is in the other of its modes; and circuit means for gradually reducing residual strain imparted to said piezo-ceramic leaf in response to the selection of one of said conditions of said mode-selecting means.

5. A system according to claim 4; in which said circuit means is operative to gradually reduce to zero the amplitude of said control signal in response to said one condition of said mode-selecting means.

6. A system according to claim 5; in which said circuit means includes a capacitor and an electric supply source, and said capacitor is charged from said supply source and discharged in response to said different conditions, respectively, of said mode-selecting means.

* * * * *